United States Patent Office 3,651,106
Patented Mar. 21, 1972

3,651,106
PREPARATION OF 2-(6-METHOXY-2-NAPHTHYL)
PROPIONIC ACID, -1-PROPANOL, AND PRO-
PANAL AND INTERMEDIATES THEREFOR
Ian T. Harrison, Palo Alto, Calif., assignor to Syntex
Corporation, Panama, Panama
No Drawing. Filed Sept. 30, 1969, Ser. No. 862,501
Int. Cl. C07f 3/08, 3/02, 1/02
U.S. Cl. 260—429 R        4 Claims

ABSTRACT OF THE DISCLOSURE

Compounds having the formula

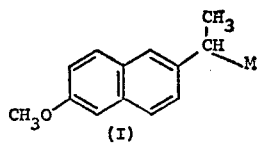

are carboxylated to yield the corresponding 2-(6-methoxy-2-naphthyl)propionic acid; carbonylated to yield the corresponding 2-(6 - methoxy - 2 - naphthyl)propanal, or carbinolated to yield the corresponding 2-(6-methoxy-2-naphthyl)-1-propanol. In the formula M represents —MgX (X=Cl, Br, I), Li, Na, K, $Zn_{1/2}$, $Cd_{1/2}$, and the like. The products have anti-inflammatory, analgesic and anti-pyretic activities.

This invention relates to the preparation of 2-(6-methoxy-2-naphthyl)propionic acid, 2-(6-methoxy-2-naphthyl)propanal, and 2-(6-methoxy - 2 - naphthyl)-1-propanol.

In general, one aspect of this invention is a process for preparing 2-(6-methoxy-2-naphthyl)propionic acid comprising the steps of reacting a compound having the formula

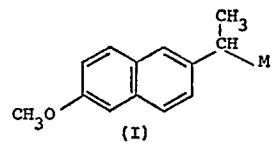

wherein M is MgCl, MgBr, MgI, Li, Na, K, $Zn_{1/2}$, or $Cd_{1/2}$, with carbon dioxide, ethyl orthocarbonate or ethyl chloroformate; treating the reaction mixture with acid until 2-(6-methoxy-2-naphthyl)propionic acid is formed; and separating 2-(6-methoxy-2-naphthyl)propionic acid from the reaction mixture. Preferably, the product is resolved to yield d 2-(6-methoxy-2-naphthyl)propionic acid as the final product.

Another aspect of this invention is a process for preparing 2-(6-methoxy-2-naphthyl)propanal comprising the steps of reacting the compound having the formula

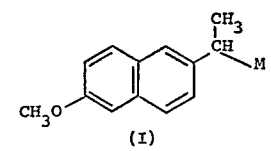

wherein M is MgCl, MgBr, MgI, Li, Na, K, $Zn_{1/2}$ or $Cd_{1/2}$ with ethyl formate, or ethyl orthoformate; treating the reaction mixture with acid until 2-(6-methoxy-2-naphthyl) propanal is formed; and separating 2-(6-methoxy-2-naphthyl)propanal from the reaction mixture.

A further aspect of this invention is a process for preparing 2-(6-methoxy-2-naphthyl)-1-propanol comprising the steps of reacting a compound having the formula

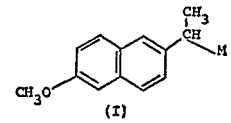

wherein M is MgCl, MgBr, MgI, Li, Na, K, $Zn_{1/2}$, or $Cd_{1/2}$ with formaldehyde; treating the reaction mixture with an acid until 2-(6-methoxy-2-naphthyl)-1-propanol is formed; and separating 2-(6-methoxy-2-naphthyl)-1-propanol from the reaction mixture.

The process of this invention can be represented by the following formulas:

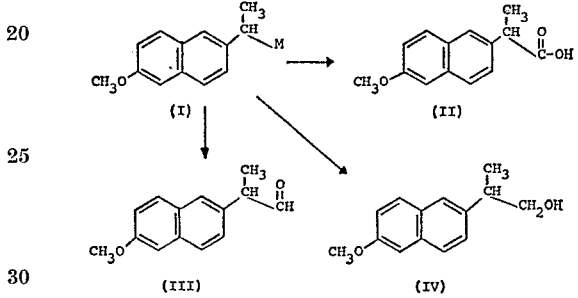

wherein M is as previously defined, preferably MgCl, MgBr or MgI.

The compound of Formula II is prepared by reacting the compounds of Formula I with carbon dioxide, ethyl orthocarbonate, or ethyl chloroformate at a temperature of from −65 to 100° C., preferably from −65 to 25° C., and treating the reaction product with acid until the compound of Formula II is prepared.

For carboxylation with carbon dioxide, the compound of Formula I is preferably contacted with solid carbon dioxide, and the mixture is allowed to warm to room temperature. For reaction with ethyl orthocarbonate and ethyl chloroformate, the compound of Formula I is preferably mixed with the reagent at about room temperature.

Suitable solvents of this reaction include any solvent which is inert to the compound of Formula I and the reagent. Suitable solvents include ethers such as diethyl ether, dimethoxyethane, tetrahydrofuran, tetrahydropyran, and the like.

The reaction mixture is then acidified with an organic or inorganic acid, preferably a strong acid such as trifluoroacetic acid, p-toluenesulfonic acid, hydrochloric acid, sulfuric acid, phosphoric acid, hydroiodic acid, hydrobromic acid and the like.

When carboxylation is accomplished with carbon dioxide, the compound of Formula II is formed immediately after the intermediate compound is acidified. When carboxylation is accomplished with the ethyl orthocarbonate or ethyl chloroformate, the reaction mixture containing the intermediate is treated with excess acid at a temperature of from 25° C. to the reflux temperature until the compound of Formula II is formed. Usually from 1 to 48 hours is sufficient.

The compound of Formula II is then separated from the reaction mixture. For example, if the organic solvent in the reaction mixture has been removed and replaced with water, acidification immediately precipitates the compound of Formula II. The precipitate can be separated by filtration and recrystallized from acetone-hexane. If the reaction mixture contains organic solvent, it can be extracted with ether, and the organic phase can be evaporated to yield the compound of Formula II which is recrystallized from acetone-hexane. Other conventional separating procedures can be used including chromatography and the like.

The compound of Formula III is prepared by reacting the compounds of Formula I with ethyl formate or ethyl orthoformate in a suitable inert organic solvent at a temperature of from −40 to 60° C. followed by acidification of the reaction mixture. Preferably, the compound of Formula I is added to ethyl formate or ethyl orthoformate at a temperature of about −30° C. and the reaction mixture allowed to warm to room temperature. It can then be immediately acidified with a dilute acid of the type described above and maintained at a temperature of from 0° C. to reflux temperature until the compound of Formula III is formed. Usually from 10 minutes to 12 hours is sufficient.

The compound of Formula III is then separated from the reaction mixture. For example, the reaction mixture can be diluted with water, extracted with diethyl ether, and the ether phase evaporated. The residue can then be recrystallized from acetone-hexane to yield the compound of Formula III. Alternatively, other conventional separating procedures can be used including chromatography and the like.

The compound of Formula IV is prepared by treating the compound of Formula I with formaldehyde, preferably as paraformaldehyde at a temperature of from 40° C. to the reflux temperature of the mixture until one molar equivalent of formaldehyde has reacted with the compound of Formula I. Usually, from one to 48 hours is sufficient for this reaction, the particular time depending upon the temperature of reaction mixture. The reaction mixture is then acidified with a suitable acid, preferably a dilute acid of the type described above, and the compound of Formula IV is separated from the reaction mixture by conventional procedures. For example, the intermediate reaction mixture can be evaporated to dryness, and the residue acidified with a dilute acid and diluted with water to precipitate the compound of Formula IV. This can be separated by filtration and recrystallized from acetone-hexane. Alternatively, the compound of Formula IV can be removed by extraction with ether or a similar solvent, and the ether phase evaporated to yield a residue which is recrystallized from acetone-hexane. Other conventional separation procedures including chromatography can also be used.

The preferred compound of Formula II is d 2-(6-methoxy-2-naphthyl)propionic acid. To obtain this product, optical resolution of the compound of Formula II can be achieved by selective biological degradation or by preparation of diastereo isomer salts of the 2-(6-methoxy-2-naphthyl)propionic acid with a resolved optically active base such as cinchonidine and then separating the thus formed diastereo isomer salts by fractional crystallization. The separated diastereo isomer salts are then acid cleaved to yield the respective d 2-(6-methoxy-2-naphthyl)propionic acid.

The preferred compound of Formula IV is l 2-(6-methoxy-2-naphthyl)-1-propanol. This can be prepared by optical resolution of the compounds of Formula III such as by selective biological degradation or by preparation of diastereo isomer salts of a dicarboxylic acid ester, e.g. phthalic acid ester of the 2-(6-methoxy-2-naphthyl)-1-propanol with a resolved optically active amine base such as cinchonidine and then separating the thus formed isomers by fractional crystallization. The separated isomer salts are then acid cleaved to yield the respective ester which is then hydrolyzed to yield the corresponding l 2-(6-methoxy-2-naphthyl)-1-propanol.

The compounds of Formula I are prepared by a procedure which can be illustrated as follows:

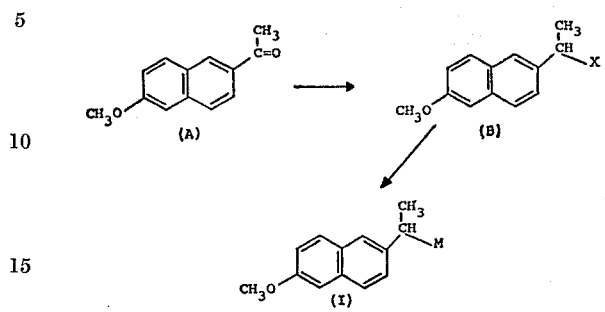

In the above formulas, M is as previously defined and X is iodo, bromo or chloro.

The compounds of Formula B are prepared by the following procedure: the compounds of Formula A are reduced to the corresponding alcohol by treatment with sodium borohydride in ethanol at room temperature for 30 minutes followed by gently acidifying the reaction mixture with dilute hydrochloric acid, and extracting the reaction mixture with diethyl ether. The ether phase is evaporated to dryness to yield the alcohol. The residue is reacted with p-toluenesulfonyl chloride in pyridine at room temperature for about 15 hours followed by washing with dilute hydrochloric acid, extraction with ether, and evaporating the ether phase to yield the corresponding p-toluenesulfonate. The residue of this reaction is then reacted with excess lithium halide (lithium bromide, chloride or iodide) in acetone for 24 hours at room temperature, and the reaction mixture is diluted with water and extracted with ether. The ether phase is then evaporated to dryness to yield the corresponding halides of Formula B.

The compounds of Formula I wherein M is MgCl, MgBr or MgI (the preferred compounds) are prepared by reacting the corresponding halide of Formula B in tetrahydrofuran with an excess of powdered magnesium at about 45° C. The reaction product is then separated from the excess metal. The same procedure can be used to form the corresponding compounds of Formula I wherein M is Li, or $Zn_{1/2}$ by replacing the magnesium powder with the corresponding lithium or zinc powder.

The compounds of Formula I wherein M is $Cd_{1/2}$ are prepared by treating the corresponding compound wherein M is MgBr with cadmium chloride in tetrahydrofuran at room temperature for about 30 minutes. Repeating this procedure but replacing the cadmium chloride with finely divided sodium or potassium is suitable for preparing the compounds of Formula I wherein M is Na or K.

The compounds of Formulas II, III and IV exhibit anti-inflammatory, analgesic and anti-pyretic activities and are accordingly employed in the treatment of inflammation, pain and pyrexia in mammals. For example, inflammatory conditions of the muscular skeletal system, skeletal joints and other tissues can be treated. Accordingly, these compounds are useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 12.5 g. of 1-bromo-1-(6-methoxy-2-naphthyl)-ethane in 100 ml. of tetrahydrofuran is slowly added to a stirred mixture of 10 g. of magnesium powder in 100 ml. of tetrahydrofuran at 45° C. After the addition is complete, the mixture is stirred for 15 minutes, and the solution is separated from the excess metal to yield 1-(6-methoxy-2-naphthyl)-1-ethyl magnesium bromide.

Repeating the above procedure but replacing the magnesium powder with lithium or zinc powder forms the corresponding 1-(6-methoxy-2-naphthyl)-1-ethyl lithium and zinc.

The above solution (following separation from the excess metal) is mixed with 7 g. of cadmium chloride, and the reaction mixture is stirred for 30 minutes to yield a solution containing the corresponding 1-(6-methoxy-2-naphthyl)-1-ethyl cadmium. Repeating this procedure but replacing the cadmium chloride with finely divided sodium or potassium yields the corresponding 1-(6-methoxy-2-naphthyl)-1-ethyl sodium or potassium.

EXAMPLE 2

A solution of 1-(6-methoxy-2-naphthyl)-1-ethyl magnesium bromide in 200 ml. of tetrahydrofuran is poured onto 500 g. of solid carbon dioxide. After allowing the mixture to warm to room temperature, the solvent is removed in vacuo, and the residue is treated with excess dilute hydrochloric acid. The acidification precipitates 2-(6-methoxy-2-naphthyl)propionic acid which is separated from the reaction mixture by filtration and recrystallized from acetone-hexane.

Repeating the above procedure but replacing 1-(6-methoxy-2-naphthyl)-1-ethyl magnesium bromide with the corresponding 1-(6-methoxy-2-naphthyl)-1-ethyl magnesium iodide,
1-(6-methoxy-2-naphthyl)-1-ethyl magnesium chloride,
1-(6-methoxy-2-naphthyl)-1-ethyl lithium,
1-(6-methoxy-2-naphthyl)-1-ethyl zinc,
1-(6-methoxy-2-naphthyl)-1-ethyl cadmium,
1-(6-methoxy-2-naphthyl)-1-ethyl sodium, and
1-(6-methoxy-2-naphthyl)-1-ethyl potassium yields, in each instance, the corresponding 2-(6-methoxy-2-naphthyl)propionic acid.

EXAMPLE 3

Ten grams of ethyl orthocarbonate is added to a solution of 0.5 equivalent of 1-(6-methoxy-2-naphthyl)-1-ethyl magnesium bromide in 250 ml. of tetrahydrofuran, and the reaction mixture is stirred for 4 hours. Excess 4 N hydrochloric acid is then slowly added to the reaction mixture, and it is heated under reflux for 24 hours. The reaction mixture is extracted with diethyl ether, the ether phase is evaporated to dryness, and the residue is recrystallized from acetone-hexane to yield 2-(6-methoxy-2-naphthyl)propionic acid.

Repeating this procedure but replacing 1-(6-methoxy-2-naphthyl)-1-ethyl magnesium bromide with the corresponding 1-(6-methoxy-2-naphthyl)-1-ethyl magnesium iodide,
1-(6-methoxy-2-naphthyl)-1-ethyl magnesium chloride,
1-(6-methoxy-2-naphthyl)-1-ethyl lithium,
1-(6-methoxy-2-naphthyl)-1-ethyl zinc,
1-(6-methoxy-2-naphthyl)-1-ethyl cadmium,
1-(6-methoxy-2-naphthyl)-1-ethyl sodium, and
1-(6-methoxy-2-naphthyl)-1-ethyl potassium yields, in each instance, the corresponding 2-(6-methoxy-2-naphthyl)propionic acid.

EXAMPLE 4

A solution of 1-(6-methoxy-2-naphthyl)-1-ethyl magnesium bromide (0.5 equivalent) in 100 ml. of tetrahydrofuran is slowly added to a solution of 6 g. of ethyl chloroformate in 100 ml. of tetrahydrofuran. The mixture is then acidified with 75 ml. of concentrated hydrochloric acid, and the mixture is heated under reflux for 24 hours. The reaction mixture is then diluted with water and extracted with diethyl ether. The ether phase is evaporated to dryness and the residue is recrystallized from acetone-hexane to yield 2-(6-methoxy-2-naphthyl)propionic acid.

Repeating the above procedure but replacing 1-(6-methoxy-2-naphthyl)-1-ethyl magnesium bromide with the corresponding 1-(6-methoxy-2-naphthyl)-1-ethyl magnesium iodide,
1-(6-methoxy-2-naphthyl)-1-ethyl magnesium chloride,
1-(6-methoxy-2-naphthyl)-1-ethyl lithium,
1-(6-methoxy-2-naphthyl)-1-ethyl zinc,
1-(6-methoxy-2-naphthyl)-1-ethyl cadmium,
1-(6-methoxy-2-naphthyl)-1-ethyl sodium, and
1-(6-methoxy-2-naphthyl)-1-ethyl potassium yields the corresponding 2-(6-methoxy - 2 - naphthyl)propionic acid.

EXAMPLE 5

A solution of 0.1 molar equivalent of 1-(6-methoxy-2-naphthyl) - 1 - ethyl magnesium bromide in 75 ml. of tetrahydrofuran is slowly added to 100 ml. of ethyl formate at —30° C. The mixture is allowed to warm to room temperature, and is then acidified with 100 ml. of 6 N hydrochloric acid, and the mixture is stirred for 1 hour. The reaction mixture is then diluted with water, extracted with diethyl ether, the ether phase evaporated to dryness, and the residue recrystallized from acetone-hexane to yield 2-(6-methoxy-2-naphthyl)-propanal.

Repeating the above procedure but replacing ethyl formate with ethyl orthoformate yields the corresponding 2-(6-methoxy-2-naphthyl)propanal.

Repeating the above procedure but replacing 1 - (6-methoxy-2-naphthyl)-1-ethyl magnesium bromide with the corresponding 1-(6-methoxy-2-naphthyl)-1-ethyl magnesium iodide,
1-(6-methoxy-2-naphthyl)-1-ethyl magnesium chloride,
1-(6-methoxy-2-naphthyl)-1-ethyl lithium,
1-(6-methoxy-2-naphthyl)-1-ethyl zinc,
1-(6-methoxy-2-naphthyl)-1-ethyl cadmium,
1-(6-methoxy-2-naphthyl)-1-ethyl sodium, and
1-(6-methoxy-2-naphthyl)-1-ethyl potassium yields the corresponding 2-(6 - methoxy - 2 - naphthyl) propanal.

EXAMPLE 6

Five grams of paraformaldehyde is added to a solution of 0.1 equivalent of 1-(6-methoxy-2-naphthyl)-1-ethyl magnesium bromide in 20 ml. of tetrahydrofuran, and the mixture is heated under reflux for 24 hours. The reaction mixture is then evaporated to dryness and acidified with excess dilute hydrochloric acid, and then diluted with water. 2 - (6 - methoxy - 2 - naphthyl)-1-propanol then precipitates from the mixture, and it is removed by filtration and crystallized from acetone-hexane.

EXAMPLE 7

A solution of dl 2 - (6 - methoxy - 2 - naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

I claim:
1. A compound selected from the group of compounds represented by the formula

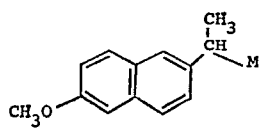

wherein M is MgCl, MgBr, MgI, Li, Na, K, $Zn_{1/2}$, or $Cd_{1/2}$.

2. A compound of claim 1 selected from the group consisting of 1 - (6 - methoxy - 2 - naphthyl) - 1 - ethyl magnesium halides wherein the halide is bromide, chloride or iodide.

3. A compound of claim 1 selected from the group consisting of 1 - (6 - methoxy - 2 - naphthyl) - 1 - ethyl alkali metals.

4. A compound of claim 1 selected from the group consisting of 1 - (6 - methoxy - 2 - naphthyl) - 1 - ethyl zinc and 1-(6-methoxy-2-naphthyl)-1-ethyl cadmium.

References Cited

Cagniat et al.: Bull. Soc. Chim. France, 1961, pp. 1938–40.

Dauben et al.; J. Am. Chem. Soc., 73 (1951), pp. 1853–4.

TOBIAS E. LEVOW, Primary Examiner

A. P. DEMERS, Assistant Exaimner

U.S. Cl. X.R.

260—429.9, 665 R, 665 G, 520, 599, 618 F, 999